A. L. SCHRAM.
HIGH SPEED GLASS DELIVERY APPARATUS.
APPLICATION FILED DEC. 26, 1916.
1,317,827.
Patented Oct. 7, 1919.
2 SHEETS—SHEET 1.
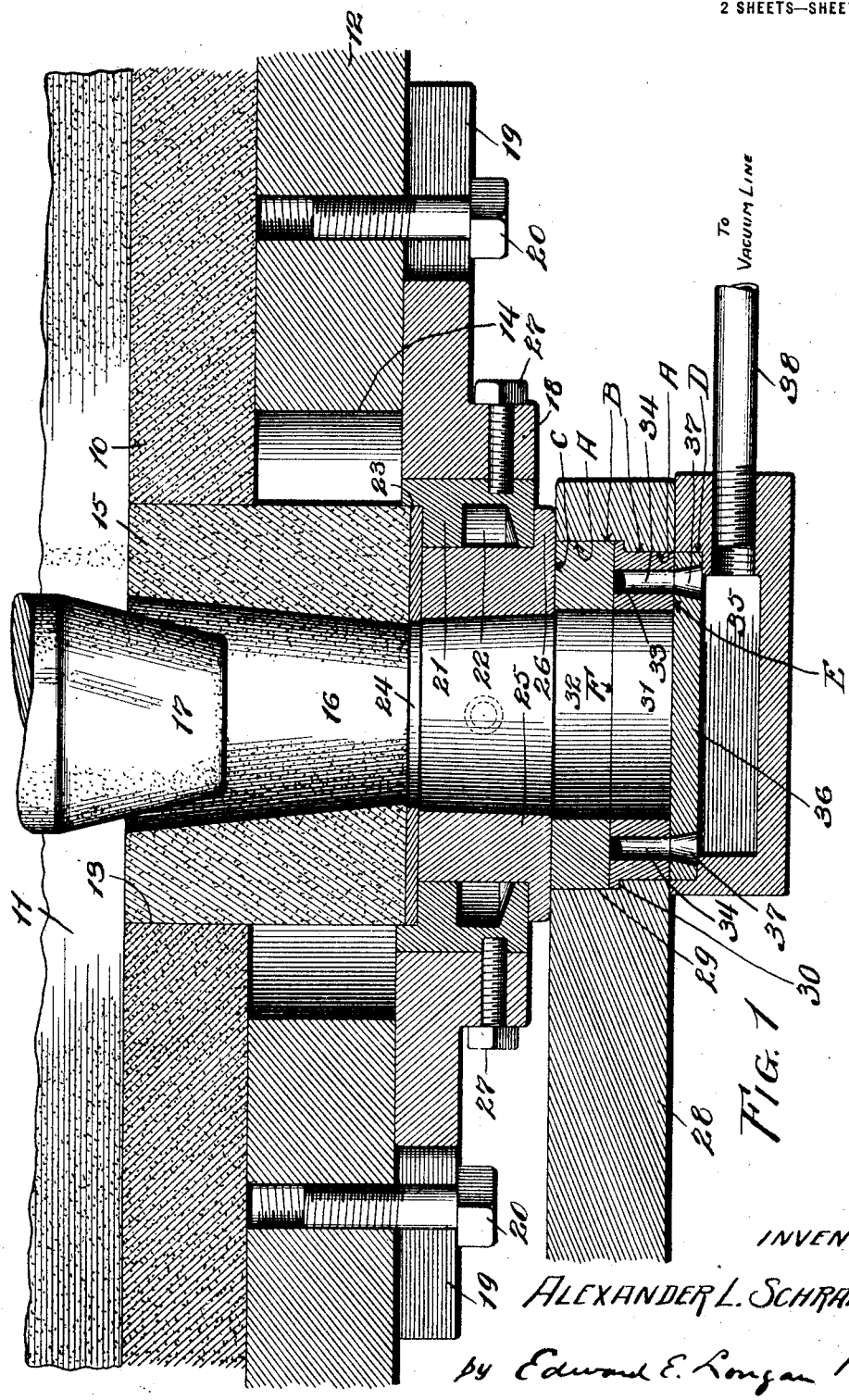
INVENTOR
Alexander L. Schram,
by Edward E. Longan Atty.

A. L. SCHRAM.
HIGH SPEED GLASS DELIVERY APPARATUS.
APPLICATION FILED DEC. 26, 1916.
1,317,827.
Patented Oct. 7, 1919.
2 SHEETS—SHEET 2.
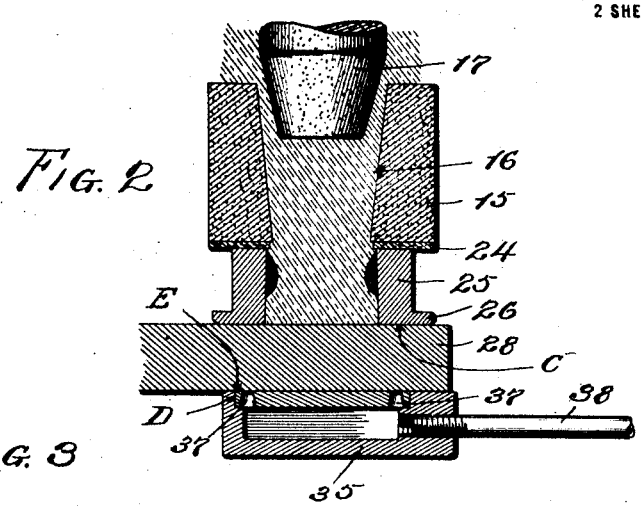
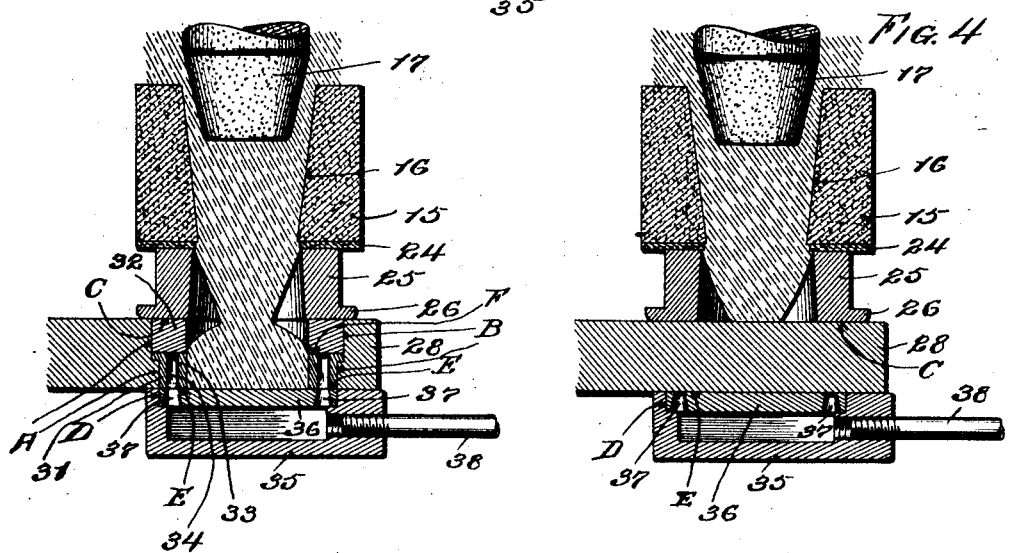
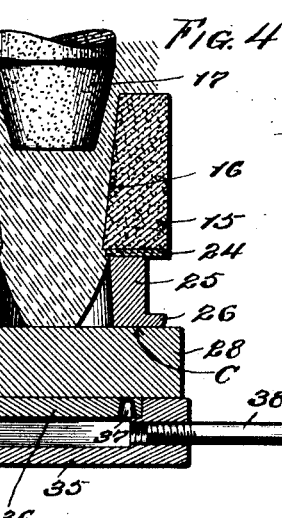
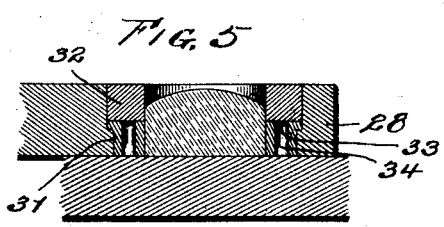
INVENTOR
ALEXANDER L. SCHRAM,
by Edward E. Longan Atty.

UNITED STATES PATENT OFFICE.

ALEXANDER L. SCHRAM, OF HILLSBORO, ILLINOIS, ASSIGNOR TO DREY AUTOMATIC GLASS MACHINE COMPANY, OF ST. LOUIS, MISSOURI, A CORPORATION OF MISSOURI.

HIGH-SPEED-GLASS-DELIVERY APPARATUS.

1,317,827.     Specification of Letters Patent.     Patented Oct. 7, 1919.

Application filed December 26, 1916. Serial No. 138,924.

*To all whom it may concern:*

Be it known that I, ALEXANDER L. SCHRAM, a citizen of the United States, and resident of Hillsboro, Montgomery county, State of Illinois, have invented certain new and useful Improvements in High-Speed-Glass-Delivery Apparatus, of which the following is a specification containing a full, clear, and exact description, reference being had to the accompanying drawings, forming a part hereof.

This invention relates to improvements in high speed glass delivery apparatuses and especially to the type in which there is a furnace projection having a discharge orifice and a forming machine which successively presents its molds immediately beneath the discharge orifice of the furnace projection.

The primary object is to so construct the molds of a forming machine and a combined gathering and severing element as to bring the molds in the closest possible proximity to the discharge orifice of the furnace, whereby to minimize the distance of glass travel in the discharge orifice to the molds to the end that a succession of molds may be charged with greater rapidity.

A further object of the improvements is to combine with the structure just defined a means whereby a vacuum or suction is employable to accelerate the movement of the glass, through the discharge orifice, by gravity, as well as to rarefy the air in the molds to the end that mold charges are produced uniformly as to weight and each charge brought to a position fully seated in the mold.

For the above purposes, the invention consists in the novel construction and arrangement of parts which are fully, clearly and concisely set forth in the following specification, pointed out in the appended claims and illustrated by the accompanying drawings, in which—

Figure 1 is a sectional elevation of a fragment of a furnace projection or boot and a fragment of a mold table of a forming machine related by an embodiment of the improvements of this application.

Fig. 2 is a sectional elevation on a reduced scale, showing the parts in a position to gather glass on the table of the forming machine.

Fig. 3 is a view similar to Fig. 2 showing the gathering in the cup of the forming machine.

Fig. 4 is a view similar to Figs. 2 and 3 showing the glass at the time of severing; and Fig. 5 is a view showing the gathering in the cup as when being carried to the point of forming.

Referring by numerals to the accompanying drawings, 10 designates the furnace projection or boot, a fragment only of which is shown, in which there is the trough 11 through which the molten glass flows outwardly or laterally from the furnace proper and the boot 10 is supported on a harness, such as 12, shown fragmentarily.

In the bottom of the boot, intersecting the trough 11 there is formed an opening 13 and in the harness 12 there is formed an opening 14, which registers with, but is of greater diametrical dimensions than the opening 13 in the boot.

Inserted upwardly through the opening in the harness and fitted into the opening in the boot is a bushing 15 having an opening formed therethrough, which communicates with the trough 11, and which opening will for convenience be termed the discharge orifice and designated by the numeral 16.

The numeral 17 designates a plug whose function is to regulate the volume of glass moving through the orifice 16.

The numeral 18 designates a collar, having at opposite sides the arms 19 whereby it may be secured to the harness and by preference said arms are slotted to receive the screws 20, whereby the collar may be adjusted with relation to the openings in the harness and boot.

Fitted within the collar is an annular water jacket 21 having a channel 22 formed in its inner peripheral face and in its uppermost face a seat 23 into which is placed a gasket 24 and which provides a support for the bushing 15.

Into the water jacket there is fitted the combined gathering and severing tool 25 (forming a chamber), whose outer peripheral face is in watertight contact with the jacket and coacts with the channel 22 to form a water-space, which is connected by pipes, one only of which is shown by dotted lines in Fig. 1, with a source of water supply for cooling the tool 25.

At the base of the tool there is formed an outstanding flange 26, underlying the jacket. The tool and the jacket are secured to the collar 18 by means of the screws 27.

The numeral 28 designates the table of a forming machine, the upper face of which is maintained in the plane of the lower margin of the tool 25 and has formed at regular intervals, circumferentially, the openings 29, one only of which is shown, and which has its lowermost part formed of a lesser diameter than its uppermost portion, forming a shoulder 30, whereby to support within the opening a cup 31 whose lowermost face flushes the lowermost face of the table. Resting on top of the cup is a severing tool 32 in the form of a ring, whose upper face is flushed with the upper face of the table and whose inner face forms with the inner face of the said cup a cylindrical carrier for a gathering of glass. The cup 31 and severing tool 32 mounted thereon form a chamber, which is adapted to be brought into registration with the chamber formed by the gathering and severing tool 25. When the rotating table is in motion, the gathering is in the chamber formed by the tool 25, and when the table is at rest, the gathering is completed in the chamber formed by the cup 31 and ring 32 which form a continuation of the chamber formed by the tool 25. In effect the tool 25, cup 31 and ring 32 form a chamber of variable capacity. When these parts are in alinement or substantial alinement the chamber is formed of maximum capacity, and when they are out of alinement during the movement of the rotating table 28, a chamber of minimum capacity is formed.

In the uppermost face of the cup there is formed a continuous groove 33 and at opposite points diametrically there is formed vertically through the walls of the cup the ports 34 which intersect said grooves.

In a fixed position beneath the table and in vertical alinement with the tool 25 and discharge orifice is a manifold 35, having fitted therein flush with its upper face a plate 36 having the ports 37 therein arranged to register at times with the ports 34 of the cup. The plate 36 seated in the manifold forms in the manifold below the plate what might be termed a vacuum chamber, this chamber being in communication at times through ports 37 with the gathering chamber. Leading from the manifold there is a tube 38 for connection with a vacuum pump, or other suction creating means or source not shown.

The boot, the bushing and the plug described, are preferably constructed of ceramic, or other, material capable of withstanding the temperature required to maintain glass in a molten or working condition.

The meeting faces A and B of the cup elements and table openings, the meeting faces C between the gathering and severing tool and the table and uppermost cup member, the meeting faces D of the manifold and ported plate and the meeting faces E between the plate of the manifold and the lowermost cup member are all machined to fit air tight. But the meeting faces F between the cup members are machined to allow air leakage therebetween, for purpose hereinafter made clear.

While the drawings do not illustrate the same, it is to be understood that the plug 17 is adjustably mounted with relation to the bushing 15 and discharge orifice 16 whereby the volume of glass moving through the orifice may be controlled and it is pointed out here that any of the known means for plug adjustment may be resorted to.

It is to be understood further that the table is intermittently rotated in synchronism with means for transferring the gatherings or batches from the cups (shown) to molds (not shown) but such means of themselves form no part of this invention and hence have not been specifically described, and it is pointed out here that any of the well known means for this purpose may be employed.

The operation of the machine is substantially as follows:

Assuming the table of the forming machine to be in intermittent motion, and successively presenting the cups to registration with the discharge orifice and the plug adjusted to feed a volume of glass, to the gathering tool, less than the capacity of the tool, and, in the interval of time required to move the table from station to station.

By reference to Fig. 2 of the drawing, it will be seen that when the discharge of glass is controlled as just described the gathering is less than the capacity of the chamber, that is the gathering resting on the upper surface of the mold table between the cups has an attenuated portion, but whose base is in intimate contact with a portion of the wall of the gathering tool throughout its circumference, and it is to be understood that this gathering takes place during a movement of the table.

In Fig. 3 there is illustrated the gathering just described as dropped into one of the cups, and at a time when the table is not in motion. And it is to be particularly observed that the gathering, that is its major portion, is of substantially the same formation when dropped to the cup as immediately following its gathering, and that in dropping the attenuated portion referred to is further attenuated to facilitate the severing act.

After the gathering has dropped to the cup the table is again set in motion and the gathering separated from the supply at its reduced neck or attenuation by a shear action of the lower face of the gathering and severing tool and the upper face of the uppermost cup member, at a time of course when the table is in motion.

In the last mentioned interval of time, that is when the table is in motion and immediately succeeding the severing step, the glass severed from the supply and resting in the cup recedes somewhat from the upper face of the cup and assumes a plano-convex form in cross section with its peripheral face resting against the walls of the cup as shown in Fig. 5 in which condition it is delivered to a mold for forming.

During this same interval of time the severed, attenuated end of the supply, as shown in Fig. 4 is builded up or enlarged by flattening out on the mold table to again assume the form as shown in Fig. 2.

Molten glass as is well known, is a highly viscous and coherent substance and is further possessed of a tenacious quality tending to adhere to any contacting body or surface. For these reasons, the movement of glass through a discharge orifice into a receiving cup is necessarily extremely sluggish and I have therefore, reduced to a minimum the distance of glass travel by placing the gathering tool immediately next the discharge orifice and produce a gathering for delivery to a cup with a minimum of surface contact with the gathering tool.

It will be obvious then that by reducing the distance of glass travel from the discharge orifice to the gathering tool and the reducing of the surface contact of the gathering with the gathering tool, the act of gathering is reduced materially as to time, to the end that the cups may be successively filled with greater rapidity and the output of the machine increased.

In accession to the improved arrangement of parts, just recited the suction or vacuum means described serves to accelerate the movement of glass through the discharge orifice, gathering tool and receiving cup by rarefying the air beneath the gathering to the end that the gathering is moved more rapidly than by gravity alone and the "rest" interval of the table may be greatly shortened.

When the table is in motion and the glass is gathering on the top of the table, the table, as clearly shown in Fig. 2 closes the ports 37 in the plate of the manifold and permits the gathering to form with the attenuation, and of a lesser size than the capacity of the gathering tool, and with its base in intimate contact with the walls of the gathering tool.

After the gathering period and at a time when the gathering tool is brought to register with a cup, the table is brought to a stop with the ports 37 of the vacuum manifold in registration with the ports 34 of the lowermost cup element, thereby, through the groove 33 and between the faces F of the cup elements the air in the gathering tool is exhausted and brought below atmospheric pressure by being brought into communication with the suction means or source of vacuum, to the end that the gathering is drawn into the cup, bodily and in a minimum of time and its attenuated portion further reduced to facilitate the severing as well as to reduce to a minimum the volume of glass between the body of the gathering and the severing point, to the end that the gathering in the cup may be quickly brought to recede uniformly beneath the plane of the uppermost cup surface, thereby facilitating the subsequent transfer or delivery to a mold.

It is to be noted that when the combined gathering and severing tool 25, the severing tool 32 and the cup 31 are brought to aline with the bushing 15, the forming machine, so far as glass communication is concerned, is in effect, a continuation of the furnace, without space interval, hence the glass from the furnace to the gathering tools is not subjected to chilling by exposure to atmosphere with the result that with its temperature maintained at substantially furnace heat in its complete delivery the glass will not suffer a change in fluidity detrimental to its movement during its travel from the furnace to the gathering tools, as is common with delivering apparatuses which expose the glass in its travel from the furnace to the gathering tools. By providing a vacuum chamber beneath the discharge outlet the gathering of the glass is accelerated, thus making it possible to give a more rapid intermittent motion to the table of the forming machine. It will be observed that the gathered batch is at all times protected from atmospheric conditions until the discharge into the mold, and furthermore the batch is accumulated in a chamber completely closed at all times. That is to say, when the cup carried by the rotating table is in registration with the cup or tool 25, these cups form a continuous chamber which is closed by the plate 36 in the manifold. During the movement of the rotating table the cup or tool 25 is closed by the top of the table. The initial gathering illustrated in Fig. 2 is in a closed chamber, and the final gathering or batch is in the chamber formed by the cup or tool 25 and the cup carried by the rotating table.

Having thus described the invention, what is claimed as new therein is:—

1. A machine of the class described comprising a water jacketed cup secured around the discharge outlet of a molten glass receptacle, an intermittently moving table provided with an opening, a cup provided with a groove in its top edge and with ports, mounted in the table opening and adapted to be brought into registration with the cup surrounding the discharge outlet, and a vacuum chamber positioned beneath the intermittently moving table and adapted to be brought into communication with the gathering cup during the operation of gathering the batch.

2. A device of the class described comprising in combination with the discharge outlet of a molten glass receptacle, a water jacketed cup mounted below and around said discharge orifice, an intermittently moving table provided with a series of openings, a cup provided with a groove in its top edge and with ports mounted in the openings of the table and adapted to be brought into registration with the cup surrounding the discharge outlet, a ring mounted on said cup, said ring and the edge of the cup surrounding the discharge outlet forming shearing members for separating the accumulated glass from the stream, and a vacuum chamber positioned beneath the intermittently moving table and adapted to be brought into communication with the gathering cups during the final gathering of the batch.

3. In a machine of the class described, a fixed cup or chamber secured beneath and around the discharge outlet of a molten glass receptacle, a movable cup comprising a ring, a cup-shaped element provided with a channel in its top edge and intersecting ports, and a vacuum chamber in communication with the fixed cup through the lower cup when they are in registration.

4. In a device of the class described, a gathering chamber in which a batch of glass from a freely flowing stream may be gathered, comprising a water jacketed fixed cup surrounding the discharge outlet from a flowing stream of glass, an intermittently moving mold table adapted to open and close the bottom of said cup, said mold table being provided with a series of openings adapted to be brought into registration with said cup, cups mounted in the mold table adapted to be brought into registration with the fixed cup, the contacting edge of the fixed cup surrounding the discharge outlet and the edge of the cups carried by the mold table forming shearing members for cutting the gathered batch from the stream, and a vacuum chamber positioned beneath the rotating mold table and adapted to be brought into communication with the cup surrounding the discharge orifice through the cups carried by the mold table.

5. In a device of the class described, a stationary chamber positioned around the discharge outlet of a molten glass receptacle, an intermittently rotating plate for opening and closing the bottom of said chamber, a series of movable chambers carried by the intermittently rotating plate adapted to be brought into communication with the stationary chamber for increasing the capacity thereof, the lower edge of the stationary chamber and the upper edges of the movable chambers forming shearing members for separating the gathered gob of glass from the on-coming glass, and a stationary vacuum chamber for closing the bottom of the chamber formed by the stationary chamber and the movable chamber in communication with the stationary chamber through the movable chambers.

6. In a device of the class described, a gathering chamber for gathering a batch from a continuously flowing stream comprising a water cooled stationary chamber arranged around the discharge outlet of the molten glass receptacle, an intermittently rotating plate for opening and closing the bottom of said chamber, an intermittently moving chamber adapted to be brought into registration with the stationary chamber, the edges of the stationary chamber and the movable chamber forming shearing members for severing the accumulated gob from the on-coming stream, and a stationary member located beneath the rotating plate for closing the chamber formed, when the stationary chamber and movable chamber are in registration.

7. An apparatus for discharging molten glass, comprising a receptacle provided with a discharge outlet, a metallic harness surrounding the outlet, a detachable initial gathering chamber secured to the harness and surrounding the outlet, an intermittently rotating plate for opening and closing the bottom of said chamber, an intermittently rotating chamber carried by the rotating plate and adapted to be brought into registration with the first mentioned chamber, whereby the capacity of the first mentioned chamber is increased, the lower edge of the first mentioned chamber and the upper edge of the movable chamber acting as shearing members for separating the accumulated gob of glass from the on-coming stream, and a stationary plate for closing the bottom of the movable chamber during the interval of rest of the rotating plate.

8. A device of the class described comprising in combination with a molten glass receptacle provided with a discharge outlet, a water cooled stationary initial gathering chamber secured around the outlet, a rotating plate for opening and closing the bottom of said chamber, a chamber carried by said plate and adapted to be brought into registration with the stationary chamber for increasing the capacity of the same and to form a final gathering chamber, and a stationary bottom for the final gathering chamber composed of the stationary and movable chambers.

In testimony whereof I have signed my name to this specification in presence of two subscribing witnesses.

ALEXANDER L. SCHRAM.

Witnesses:
 THOS. H. GALBRAITH,
 R. G. ORWIG.

Copies of this patent may be obtained for five cents each, by addressing the "Commissioner of Patents, Washington, D. C."